United States Patent
Robinson et al.

(10) Patent No.: US 7,533,809 B1
(45) Date of Patent: May 19, 2009

(54) SYSTEM AND METHOD FOR OPERATING A PARKING FACILITY

(75) Inventors: Timothy L. Robinson, Reston, VA (US); Bradford R. Schildt, Boulder, CO (US); Tennille V. Goff, Springfield, VA (US); Daniel J. Corwin, Fredericksburg, VA (US); Timothy Neil Watson, Alexandria, VA (US)

(73) Assignee: YT Acquisition Corporation, Delray Beach, FL (US)

( * ) Notice: Subject to any disclaimer, the term of this patent is extended or adjusted under 35 U.S.C. 154(b) by 368 days.

(21) Appl. No.: 11/141,033

(22) Filed: Jun. 1, 2005

Related U.S. Application Data

(63) Continuation-in-part of application No. 10/840,784, filed on May 7, 2004, now abandoned, which is a continuation-in-part of application No. 10/625,045, filed on Jul. 23, 2003, now abandoned, which is a continuation-in-part of application No. 10/369,235, filed on Feb. 19, 2003, now abandoned, which is a continuation-in-part of application No. 10/251,305, filed on Sep. 20, 2002, now Pat. No. 7,269,737.

(60) Provisional application No. 60/324,229, filed on Sep. 21, 2001.

(51) Int. Cl.
*G06K 5/00* (2006.01)
(52) U.S. Cl. .................. 235/382; 235/384; 705/62
(58) Field of Classification Search ............... 235/382, 235/384; 705/67, 62
See application file for complete search history.

(56) References Cited

U.S. PATENT DOCUMENTS

| | | | |
|---|---|---|---|
| 4,230,214 A | 10/1980 | Cortez | |
| 4,359,631 A | 11/1982 | Lockwood et al. | |
| 4,553,222 A | 11/1985 | Kurland et al. | |
| 4,716,593 A | 12/1987 | Hirai et al. | |
| 4,879,747 A | 11/1989 | Leighton et al. | |
| 4,915,205 A | 4/1990 | Reid et al. | |
| 4,995,081 A | 2/1991 | Leighton et al. | |
| 5,042,073 A | 8/1991 | Collot et al. | |
| 5,086,389 A | 2/1992 | Hassett et al. | |
| 5,144,553 A | 9/1992 | Hassett et al. | |
| 5,274,695 A | 12/1993 | Green | |
| 5,280,527 A | 1/1994 | Gullman et al. | |
| 5,289,183 A | 2/1994 | Hassett et al. | |
| 5,335,288 A | 8/1994 | Faulkner | |

(Continued)

FOREIGN PATENT DOCUMENTS

EP 0598469 A2 5/1994

(Continued)

OTHER PUBLICATIONS

S. Davies. Touching Big Brother. How Biometric Technology Will Fuse Flesh and Machine. Information Technology & People. vol. 7 (4) 1994.

(Continued)

*Primary Examiner*—Karl D. Frech
(74) *Attorney, Agent, or Firm*—Pepper Hamilton LLP

(57) ABSTRACT

A system and method of conducting parking transactions in a convenient manner is described. Users of the system can employ their biometric data or a preexisting token to conduct transactions at a parking facility.

28 Claims, 2 Drawing Sheets

U.S. PATENT DOCUMENTS

| | | |
|---|---|---|
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |
| 5,483,601 A | 1/1996 | Faulkner |
| 5,485,510 A | 1/1996 | Colbert |
| 5,523,551 A | 6/1996 | Scott |
| 5,546,523 A | 8/1996 | Gatto |
| 5,581,630 A | 12/1996 | Bonneau, Jr. |
| 5,594,806 A | 1/1997 | Colbert |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,028,950 A | 2/2000 | Merjanian |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,160,903 A | 12/2000 | Hamid et al. |
| 6,161,059 A | 12/2000 | Tedesco et al. |
| 6,161,090 A | 12/2000 | Kanevsky et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,222,914 B1 | 4/2001 | McMullin |
| 6,230,148 B1 | 5/2001 | Pare, Jr. et al. |
| 6,233,564 B1 | 5/2001 | Schulze, Jr. |
| 6,246,751 B1 | 6/2001 | Bergl et al. |
| 6,269,348 B1 | 7/2001 | Pare, Jr. et al. |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 | 3/2002 | Adams et al. |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Puchek et al. |
| 6,497,360 B1 | 12/2002 | Schulze |
| 6,498,970 B2 | 12/2002 | Colmenarez et al. |
| 6,507,912 B1 | 1/2003 | Matyas et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | De Rafael et al. |
| 6,532,459 B1 | 3/2003 | Berson |
| 6,539,282 B2 | 3/2003 | Metcalf et al. |
| 6,542,874 B1 | 4/2003 | Walker |
| 6,554,705 B1 | 4/2003 | Cumbers |
| 6,559,776 B2 | 5/2003 | Katz |
| 6,567,787 B1 | 5/2003 | Walker et al. |
| 6,581,042 B2 | 6/2003 | Pare et al. |
| 6,591,224 B1 | 7/2003 | Sullivan et al. |
| 6,594,376 B2 | 7/2003 | Hoffman et al. |
| 6,636,973 B1 | 10/2003 | Novoa et al. |
| 6,646,568 B2 | 11/2003 | MacPhail et al. |
| 6,647,372 B1 | 11/2003 | Brady et al. |
| 6,650,999 B1 | 11/2003 | Brust et al. |
| 6,651,063 B1 | 11/2003 | Vorobiev |
| 6,653,946 B1 | 11/2003 | Hassett |
| 6,655,585 B2 | 12/2003 | Shinn |
| 6,662,166 B2 | 12/2003 | Pare et al. |
| 6,685,088 B1 | 2/2004 | Royer et al. |
| 6,694,300 B1 | 2/2004 | Walker et al. |
| 6,695,206 B2 | 2/2004 | Ross |
| 6,715,673 B2 | 4/2004 | Fulcher et al. |
| 6,715,674 B2 | 4/2004 | Schneider et al. |
| 6,748,365 B1 | 6/2004 | Quinlan et al. |

| | | |
|---|---|---|
| 6,755,344 B1 | 6/2004 | Mollett et al. |
| 6,792,334 B2 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B2 | 12/2004 | Stoutenburg et al. |
| 6,854,642 B2 | 2/2005 | Metcalf et al. |
| 6,865,544 B1 | 3/2005 | Austin |
| 6,873,969 B2 | 3/2005 | Stone et al. |
| 6,886,742 B2 | 5/2005 | Stoutenburg et al. |
| 6,935,559 B2 | 8/2005 | Mollett et al. |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |
| 2002/0038165 A1 | 3/2002 | McHale, IV et al. |
| 2002/0046121 A1 | 4/2002 | Walker et al. |
| 2002/0062249 A1 | 5/2002 | Iannacci |
| 2002/0077889 A1 | 6/2002 | Kolls |
| 2002/0077890 A1 | 6/2002 | LaPointe et al. |
| 2002/0077902 A1 | 6/2002 | Marcus |
| 2002/0087413 A1 | 7/2002 | Mahaffy et al. |
| 2002/0091537 A1 | 7/2002 | Algazi |
| 2002/0094111 A1 | 7/2002 | Puchek et al. |
| 2002/0111917 A1 | 8/2002 | Hoffman et al. |
| 2002/0112177 A1 | 8/2002 | Voltmer et al. |
| 2002/0116266 A1 | 8/2002 | Marshall |
| 2002/0128851 A1 | 9/2002 | Chefalas et al. |
| 2002/0148892 A1 | 10/2002 | Bardwell |
| 2002/0153414 A1 | 10/2002 | Stoutenburg et al. |
| 2002/0161629 A1 | 10/2002 | Jentoft |
| 2002/0162031 A1 | 10/2002 | Levin et al. |
| 2002/0173986 A1 | 11/2002 | Lehew et al. |
| 2002/0178063 A1 | 11/2002 | Gravelle et al. |
| 2002/0190125 A1* | 12/2002 | Stockhammer ............. 235/382 |
| 2002/0194128 A1 | 12/2002 | Maritzen et al. |
| 2002/0196963 A1 | 12/2002 | Bardwell |
| 2003/0006277 A1 | 1/2003 | Maskatiya et al. |
| 2003/0009382 A1 | 1/2003 | D'Arbeloff et al. |
| 2003/0009393 A1 | 1/2003 | Norris |
| 2003/0018522 A1 | 1/2003 | Denimarck et al. |
| 2003/0018567 A1 | 1/2003 | Flitcroft et al. |
| 2003/0034876 A1 | 2/2003 | Pucheck et al. |
| 2003/0046228 A1 | 3/2003 | Berney |
| 2003/0055727 A1 | 3/2003 | Walker et al. |
| 2003/0067396 A1 | 4/2003 | Hassett |
| 2003/0075287 A1 | 4/2003 | Weik |
| 2003/0076417 A1 | 4/2003 | Thomas et al. |
| 2003/0090473 A1 | 5/2003 | Joshi |
| 2003/0105725 A1 | 6/2003 | Hoffman |
| 2003/0132840 A1* | 7/2003 | Bahar ......................... 340/541 |
| 2003/0144956 A1 | 7/2003 | Yu et al. |
| 2003/0150907 A1 | 8/2003 | Metcalf et al. |
| 2003/0171985 A1* | 9/2003 | Prabhu et al. ................. 705/14 |
| 2003/0183689 A1 | 10/2003 | Swift et al. |
| 2003/0187790 A1 | 10/2003 | Swift et al. |
| 2003/0187796 A1 | 10/2003 | Swift et al. |
| 2003/0191709 A1 | 10/2003 | Elston et al. |
| 2003/0209599 A1 | 11/2003 | Gatto |
| 2003/0216967 A1 | 11/2003 | Williams |
| 2003/0216987 A1 | 11/2003 | Mollett et al. |
| 2003/0222135 A1 | 12/2003 | Stoutenburg et al. |
| 2003/0229539 A1 | 12/2003 | Algiene |
| 2003/0229540 A1 | 12/2003 | Algiene |
| 2003/0229790 A1 | 12/2003 | Russell |
| 2003/0236704 A1 | 12/2003 | Antonucci |
| 2004/0012481 A1 | 1/2004 | Brusseaux |
| 2004/0020982 A1 | 2/2004 | Hoffman et al. |
| 2004/0024672 A1 | 2/2004 | Brack et al. |
| 2004/0039632 A1 | 2/2004 | Han et al. |
| 2004/0054587 A1 | 3/2004 | Dev et al. |
| 2004/0083172 A1 | 4/2004 | Wiederin |
| 2004/0088232 A1 | 5/2004 | Minnis, Jr. |
| 2004/0088295 A1 | 5/2004 | Glazer et al. |
| 2004/0143505 A1 | 7/2004 | Kovach |
| 2004/0155101 A1 | 8/2004 | Royer et al. |
| 2004/0158524 A1 | 8/2004 | Anderson et al. |
| 2004/0192434 A1 | 9/2004 | Walker et al. |
| 2004/0201520 A1 | 10/2004 | Flick |
| 2004/0215565 A1 | 10/2004 | Huffman |
| 2004/0254840 A1 | 12/2004 | Slemmer et al. |
| 2005/0010478 A1 | 1/2005 | Gravelle |
| 2005/0055582 A1 | 3/2005 | Bazakos et al. |
| 2005/0144133 A1 | 6/2005 | Hoffman et al. |

FOREIGN PATENT DOCUMENTS

| | | |
|---|---|---|
| EP | 0762261 A2 | 3/1997 |
| JP | 358044583 A | 3/1983 |
| WO | WO 01/20525 A1 | 3/2001 |

OTHER PUBLICATIONS

Lawrence Aragon. Show me some ID. PC Week Online (http://www.zdnet.com/pcweek/0112/12bio.html) Jan. 1998.

Gerald Lazar. Agencies Scan Biometrics for Potential Applications. FCW.com (http://www.fcw.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http:/www.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty.jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. Http://www.iriscan.com/basis.htm. Dec. 1998.

Electronic Banking 1. http://www.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

"The Biometric Bar Tab Project." http://www.csee.wvu.edu/~wise/biometric/index.htm, including Dec. 9, 2002 Proposal and May 5, 2003 Team Report.

Office of NYS Attorney General Eliot Spitzer. Financial Giant Joins Fight Against Online Gambling. Press Release. http://www.zionsbank.com/bank_cards.jsp?leftNav=bf_bfinance&topNav=bfinance. Jun. 2002.

Zions Bank. Cards for Any Business Occasion. http://www.zionsbank.com/bank_cards.jsp?leftNav=bf_bfinance&topNav=bfinance.

ABSA. Purchasing Credit Card. http://www.absa.co.za/Corporate/0,2999,2210,00.html.

Visa U.S.A. Visa Purchasing. http://www.usa.visa.com/corporate/corporate_solutions/payment/visa_purchasing.html?it=cl/corporate/corporate_solutions/index%2Ehtml|Visa%20Purchasing%20.

University of Wisconsin-Green Bay. Purchasing Department: Purchasing Card. http://www.uwgb.edu/Purchasing/purchasingCard/procurement07.htm.

Reference Guides Glossary Terms (Online Glossary Terms and Definitions). Merchant Glossary: Merchant Category Code (MCC) (Merchant Category Code) (MCC) Help). http://glossary.reference-guides.com/Merchant/Merchant_Category_Code_MCC/. 2003.

University of Denver. Purchasing Card User Guide. http://www.du.edu/purchasing/purcard.html#2.%20HOW%20DOES%20THE%20CARD%20WORK?.

Williams College Controller's Office. Purchasing Card Procedures. http://www.williams.edu/admin/controller/pcard.html#whatis. Jan. 2005.

Arizona State University. The Purchasing Card: A Guide for Users. http://www.asu.edu/purchasing/pdf/purchcard.pdf. Jan. 2005.

Washington Post—For Dining In, Security Is the Order of the Day; Post 9/11 Concerns Thwarting Deliverymen: [Final Edition], 2004.

Morpho Touch—Multi-Application Finger Identification in the Palm of Your Hand, Sagem Porpho, Inc., 1999.

Video Insight. http://www.video-insight.com/dvr221.htm.

TMCnet. Cernium Installs Perceptrak Behavrior Recognition Software In Public Parking Garage In Yonkers. http://www.tmcnet.com/usubmit/2003/Dec/1021669.htm. Dec. 2003.

City of Aspen. Parking. http://www.aspenpitkin.com/depts/61/payanddisplay.cfm.

SmartCity. SmartCity Card Solutions. http://www.coinamatic.com/coinamatic_group/html/apartment_laundry_services/smartcity/Products/p4.html.

TranCore. TrasCore Access Control System First to Successfully Combine Biometrics and RFID. http://www.transcore.com/news/news050314.htm. Mar. 2005.

James P. Holmes et al. A Performance Evaluation of Biometric Identification Devices. Sandia Report. Jun. 1991.

* cited by examiner

SYSTEM AND METHOD FOR OPERATING A PARKING FACILITY

This application is a continuation-in-part of application Ser. No. 10/840,784, filed May 7, 2004 now abandoned, which is a continuation-in-part of application Ser. No. 10/625,045, filed Jul. 23, 2003 now abandoned, which is a continuation-in-part of application Ser. No. 10/369,235, filed Feb. 19, 2003 now abandoned, which is a continuation-in-part of application Ser. No. 10/251,305, filed Sep. 20, 2002 now U.S. Pat. No. 7,269,737, which claims domestic priority from provisional application No. 60/324,229, filed Sep. 21, 2001. Each of the above-identified applications is incorporated by reference herein, in its entirety, for all purposes.

FIELD OF THE INVENTION

This application relates generally to a system and method for conducting parking transactions. More particularly, the present invention relates to a system and method for allowing individuals to use biometric data or a preexisting token to conduct parking transactions.

BACKGROUND OF THE INVENTION

Generally, parking facilities employ token-based systems to conduct parking transactions. Token-based systems are often inconvenient, requiring customers to obtain a token upon entry, safeguard it until they wish to exit, and then present the token to a kiosk or parking attendant before leaving. Thus, the parking token is the key to the operation of such parking facilities. Parking tokens are usually small slips of paper that can be easily lost, which can cause several problems for the customer. An individual attempting to retrieve his car without a token usually has to pay a fine before leaving. If the garage operates on an hourly billing basis, the individual may have to pay for the maximum billable amount, regardless of the actual length of his stay. Additionally, the payment process in token-based systems can be troublesome. Payment is typically handled at the exit gate, requiring the customer to provide payment to an attendant or kiosk. This payment process is inefficient, requiring each customer to conduct a conventional transaction in order to exit. Long exit lines can develop if the parking facility experiences a sudden increase in exit transactions. Other parking systems require customers to pay at a kiosk or attendant counter before retrieving their vehicles. After paying, the customer receives the token again, only to present it once more at a parking gate to be permitted to exit. What is needed is a more efficient system and method for conducting parking transactions.

SUMMARY OF THE INVENTION

The present invention addresses the aforementioned needs by providing individuals with a convenient system and method for conducting parking transactions. Users of the system can employ their biometric data or a preexisting token to conduct transactions at a parking facility.

BRIEF SUMMARY OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
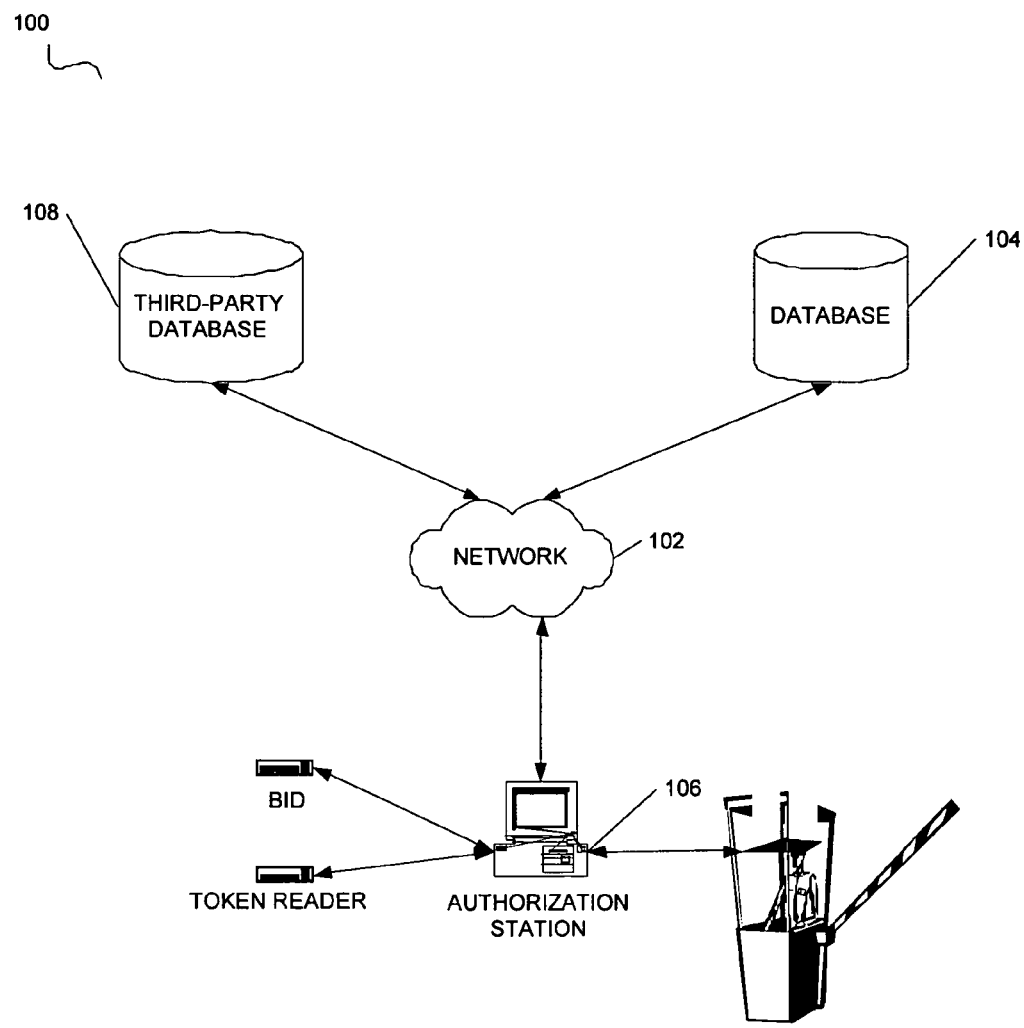
FIG. 1 illustrates a general architecture overview of a parking transaction system.

Various embodiments of the invention are discussed in detail below. While specific implementations are discussed, it should be understood that this is done for illustration purposes only. A person skilled in the relevant art will recognize that other components and configurations can be used without parting from the spirit and scope of the invention.

One typical method for conducting a parking transaction in a parking facility, such as a parking garage or parking lot, involves the use of a parking token. A parking facility user obtains a parking token upon entry from a kiosk or a parking attendant. Often such parking tokens provide a means for identifying the length of the stay, such as via a time stamp printed on the token or magnetic stripe encoded with time information. To exit the parking facility with a vehicle, the user must present the parking token to a kiosk or a parking attendant at an exit gate. In some facilities, the user must present the token for payment to a kiosk or attendant at a separate location, and then once again present the token at the exit gate.

The considerable problem with parking token systems is the heavy reliance on the issued token. The user must safeguard the token or else suffer stiff penalties. Parking facilities may require a token because it indicates that the token-holder is permitted to leave with the vehicle. Without the token, a user may not be allowed to retrieve his vehicle, or have to spend a great deal of time verifying his identity and assuring a parking attendant that the vehicle is his. Typically, a parking facility does not have a method to ensure that a parking token-holder is authorized to retrieve the vehicle. For example, a thief could steal a user's parking token and use it to obtain the user's car. Furthermore, parking facilities that bill on an hourly basis require a parking token to ascertain how long a vehicle has been parked. Without the data from the parking token, the kiosk or parking attendant cannot determine the actual length of the parking transaction. A user who loses his parking token typically has to pay the maximum fee in order to retrieve his vehicle. If the parking facility or parking attendant is lax in verifying a user's identity, a thief may find the no-token penalty fee a small price to pay when stealing a vehicle.

In automated parking token systems, a user may be able to obtain a second parking token from the token kiosk duplicitously. This can allow a user to avoid paying penalties for losing his token or can allow the user to defraud the system. For example, in order to pay a lower charge at an hourly parking garage, a user could obtain a new parking token before retrieving his car. The user can then present this new token upon exit and pay for only a few minutes rather than the full length of his stay.

Additionally, because of the widespread use of automated parking kiosks, many parking facilities are nearly unmanned. A user who needs assistance because he has lost his parking token can have difficulty locating a parking attendant to help with such matters.

The loss of a token can be particularly frustrating if the user does not realize the token is missing until he is at the exit gate.

This can be especially embarrassing if the user is attempting to exit the facility at a busy time, such as after a sporting event. The user can delay traffic significantly as other customers line up behind him waiting to exit. Not only does the user have the frustration of paying a penalty fee, but also has to deal with irate individuals growing impatient while waiting to leave. This situation can be especially troublesome if the gate is an automated kiosk. The user may have to leave his vehicle in order to locate a parking attendant, or, if the kiosk has a means of alerting a parking attendant, wait in the vehicle until an attendant arrives to resolve the matter.

A user can encounter further difficulty if a parking facility requires exact change for payment. This can be particularly irksome if the payment kiosk doubles as the exit gate because the user may have difficulty locating the proper change in his car, perhaps irritating other customers waiting in line behind his vehicle. Even if the parking facility accepts paper money, payment kiosks typically accept only low denomination bills. Such facilities are unappealing and inconvenient for users that do not carry cash or small change.

Another shortcoming of traditional parking facilities is that they do not accommodate users that wish to authorize other individuals to retrieve their vehicles without a prior arrangement. For example, a wife may park her car at an airport and leave on a business trip. While on her trip, her husband may need to retrieve her car because his own vehicle is undergoing repairs. Although the wife may wish to authorize her husband to retrieve her vehicle, she has no way of doing so, except for perhaps mailing the parking token to him.

Additionally, users often have difficulty locating their vehicles in parking facilities. This is especially true in situations where users have left their vehicles at a parking facility for a considerable amount of time. For example, a business traveler may leave his car in an airport parking lot while on an extended trip abroad. After returning, the traveler may not remember where he parked. Typical parking facilities are not equipped with a convenient method to assist users in this matter.

In addition to the problems listed above, token-based parking systems entail a variety of operational costs. Naturally, a parking facility operator must continually purchase parking tokens in order to ensure the facility functions. Automated token-based parking facilities must pay for maintenance of token dispensers and payment kiosks. In addition, manned parking facilities operators must pay labor to manage token stations, exit gates, and the like.

The present invention alleviates the aforementioned problems by providing a convenient method for parking transactions via a Parking Transaction System (PTS). By registering user identifying data in a user record, the PTS removes the need for parking tokens. In one embodiment, user identifying data is a user's biometric data. Upon entering the parking facility, the user can present his biometric data at an authorization station, such as a kiosk. The user may already be registered in the PTS, or can register while initiating a parking transaction. When the user retrieves his vehicle from the parking facility, he need only present his biometric data at an authorization station, such as an exit gate. The received biometric data is compared with the registered biometric data and, if the biometric data matches, the user can exit with his vehicle. If the user record located via biometric data includes financial account data, the system can conduct payment for the parking transaction while granting the user permission to exit with his vehicle, providing further convenience to the user.

Alternatively, users can register one more preexisting tokens in a user record for parking transaction use. The preexisting token can be any token that is associated with the user, such as a credit card, driver's license, bank card, club membership card, library card, license plate, wireless device, employee card, or the like. When entering the parking facility, the user can present his preexisting token to an authorization station. The system stores the preexisting token data in a user record or, if the user is enrolled in the system, the PTS locates the user record containing corresponding user identifying data. When the user retrieves his vehicle, he once again presents a preexisting token. This token can be the same one used to initiate the parking transaction or can be another token the user has registered in the PTS. For example, the user can present his driver's license to initiate the parking transaction and his library card to conclude the transaction, or his VISA card to initiate and his MasterCard to conclude.

Furthermore, the user can present a financial token upon parking transaction initiation and a non-financial upon parking transaction conclusion or vice versa. A financial token presented during the parking transaction can handle payment and exit authorization simultaneously. The system can use financial account data found on the token or included in the user record associated with the preexisting token. Because the preexisting token employed for the parking transaction is one that the user already carries regularly, the user need not worry about an additional token to safeguard.

Furthermore, users can register both biometric data and preexisting token data in their user record and can employ any of such data for parking transactions. For example, a user can register his biometric data and his debit card in a user record in the PTS and present his biometric data to initiate the parking transaction and his debit card to conclude the parking transaction, or vice versa. Both the user's biometric data and his preexisting token data indicate the same user record, thereby allowing the PTS to authorize the initiation and conclusion of a parking transaction accurately, regardless of which registered user identifying data is presented.

As mentioned, a user's identifying data can be used to initiate parking transaction payment. Both the biometric data and preexisting token methods alleviate many of the payment problems of traditional parking facilities. Because a user's biometric data and/or preexisting token can be associated with a financial account to be used for parking transactions, a user need not provide cash or change. Furthermore, by combining payment with exit authorization, exiting time is greatly reduced. The PTS provides a reliable and convenient method for the user to pay at a gate equipped to receive payment. Alternatively, the user can pay for parking in advance, for example, upon entering the parking facility, or at a time prior to exiting. The prepayment can be a full transaction or a preauthorization that is to be completed upon exit.

In addition, users can use the PTS to authorize another individual to park and/or retrieve their vehicle by configuring their user records appropriately. If the authorized individual is registered in the PTS, the two user records can be associated with one another. However, the authorized individual need not be registered. Instead, the user record can include identifying data for the authorized individual, such as biometric data, preexisting token data, or another identifier. To park and/or retrieve the user's vehicle, the authorized individual can provide the registered identifying data to the PTS, which can in turn locate the associated user record and allow the authorized individual to park or obtain the vehicle.

Moreover, the PTS reduces parking facility operational fees. A parking facility operator utilizing the PTS does not need to purchase and provide parking tokens. Additionally, the PTS alleviates many situations that require attendant assistance in token-based systems, thereby allowing facility operators to reduce their labor costs.

In regards to biometric embodiments of the PTS, in general, a biometric authorization refers to an authorization in which the user, an operator, such as a parking facility owner or attendant, or an agent, such as an employee of the PTS, provides biometric data to be matched against biometric data stored in user record in a database. For example, a user can undergo biometric authorization to authorize payment for a parking transaction. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered. In addition, biometric data received during an authorization can be tested for liveness to prevent system fraud. Alternatively, the PTS can provide non-biometric access for users who have nonviable biometric data or for users who wish to employ the PTS without the use of biometric data. For example, the preexisting token processes described herein can serve as non-biometric alternative for users in the event that biometric processes are not available or a user lacks sufficient biometric viability to employ the system's biometric features.

Additionally, the principles of the present invention are not limited to using one form of biometric. For example, the biometric data referred to throughout this description can represent a biometric image (or sample) and/or a mathematical representation of the biometric image, often referred to as a biometric "template." In one example, a biometric template can represent any data format that includes feature, positional, or other representing information of characteristics of biometric data. Alternatively, a template can be a mathematical representation of more than one biometric. For example, a user template can be generated from biometric data acquired from two individual fingers, such as a thumb and index finger, or from a finger and an iris scan. The biometric data can include fingerprint data, iris data, facial data, voice data, retinal data, hand architecture data, DNA data, or any other physical measurement pertaining to a user's person. User biometric data can be received by the PTS from a variety of sources, such as from the user directly or from a third-party source, such as a database, token, or the like.

Depending on the embodiment, the PTS can also provide a registered user with a user identifier, such as a system identification code (SID), phone number, name, or the like. A user identifier can serve as a pointer that can be used to aid the system in locating the storage location of a user record. Depending on the embodiment of the system, a user identifier can also serve as a user group identifier that identifies a user as an affiliate of a specified group of users. For example, when exiting a parking facility, the user can present his user identifying data and a user identifier. The user identifier assists the system by indicating a specific user record that contains the necessary data for a user authorization. During authorization, the PTS can receive the user identifier in a variety of forms. For example, if the PTS employs voice data, upon entering the parking facility, the user can speak his SID to initiate the parking transaction via biometric authorization. In this scenario, the voice data can serve as both the user identifier and the user biometric data. Alternatively, the voice data can only serve as a convenient method to provide a user identifier.

In one embodiment, a user identifier can be a preexisting token. For example, a user can provide his present driver's license and biometric data at an authorization station. The authorization station can employ data from the driver's license, such as a driver's license number, to locate the user record. The PTS can then compare the received biometric data with the biometric data stored in the user record. In one scenario, the user can register more than one preexisting token to be used as user identifiers and can employ any token to assist with biometric authorization. In one scenario, the user identifier is information wirelessly received from a preexisting token, such as via radio frequency identification (RFID), infrared, Bluetooth, or the like. For example, an RFID device, such as a SmartTag, can transmit a signal, such as a code, to an authorization station to assist with user record location. An authorization station can receive a transmitted user identifier from customers waiting to enter a parking facility. The authorization station can use the transmitted user identifier to access user information, such as biometric data, prior to the authorization, thereby increasing the efficiency of the authorization, as the station can locate the stored biometric data before the user provides his biometric data. In general, the transmission of a user identifier can provide a convenient method to assist when a user undergoes authorization in a vehicle setting. For example, if a drive-through restaurant employs biometric authorization for payments, the PTS can receive transmitted user identifiers from users waiting in line to place their orders.

FIG. 1 illustrates a general architecture overview of PTS 100. As will be described in detail below, PTS 100 enables convenient methods for parking transactions. User identifying data and other information is stored in database 104 where user records are stored. Database 104 can represent one or more databases utilized within the system. In one embodiment, database 104 is a central database to which all user records are stored and from which user records are accessed for authorization. In another embodiment, database 104 also includes one or more operator databases to which a select set of operator records are stored and from which a select set of operator records are accessed for authorization. In an additional embodiment, PTS 100 can also utilize a combination of central databases and one or more operator databases. In general, embodiments utilizing a combination of databases enable increased control of information flow throughout PTS 100. As described in detail below, various examples of information flow configurations within the system can include "open," "closed," and "selectively shared" system models. In still further embodiments, database 104 can further comprise one or more sub-databases that are contained within a particular database. In such embodiments, user data, operator data, and other data can be distributed across multiple databases within database 104.

A user record holds a variety of information allowing PTS 100 to provide flexible functionality for parking transactions. When enrolling in PTS 100, a user can present any number of identity verifying documents or testaments to his identity depending on the implementation of the system. By way of illustration and not of limitation, examples of such documents or testaments include a financial token, a digital image, a video clip, family information, or a DNA sample. A user record holds user identifying data that can be employed by PTS 100 to identify a user conducting a parking transaction, such as a user's biometric data and/or preexisting token data. Additionally, the user record can hold other user information, such as name, address, phone number, email address, SID, other user identifiers, and/or other identity verifying information related to an individual seeking authorization within the system. In addition, a user record can include financial data, such as information pertaining to credit cards, debit cards, checking account and routing information, and the like. Such financial data can be utilized for parking transaction payment. Although the information included in a user record can be described in terms of user identifying data and financial data, such groupings are for illustrative purposes only and should not be considered limiting. For example, a user record can contain credit card data that can be used for both identification and financial purposes.

In addition, a user record can include data regarding other individuals authorized to employ PTS 100 on the user's behalf. The user can establish authorization for an individual or a group of individuals and can be for limited or continuous use. For example, a user can allow family members to park and/or retrieve his vehicle from PTS 100 parking facilities. A user can add an authorized individual at AS 106 prior to, during, or subsequent to a parking transaction. These authorized individuals can be PTS 100 users themselves or can be solely associated with the user's record. The user can associate his user record with that of another user, such as by entering an identifier, such as the individual's SID or name. If the individual is to be solely associated with the user's record, the user or individual can register authorized individual data for the individual to employ when using PTS 100. Authorized individual data can include a variety of information, such as biometric data, preexisting token data, identifiers, and/or other identity verifying information related to the authorized individual. A user can establish parameters for authorized individuals included in his record. For example, a user can indicate that a particular authorized individual can park his vehicle, but not retrieve it (or vice versa). The user can designate specific parking facilities or all parking facilities in the system. For example, an employer can allow a group of employees to retrieve a company car from a parking facility. The employer can register these employees in his user record to grant them this authority. If PTS 100 is part of a larger, multi-function system, the user can authorize individuals for a variety of resources associated with his user record, such as credit cards, biometric access, or the like.

Additionally, a user record can contain information pertaining to the user's parking transactions. Parking data can include vehicle information, such as make, model, vehicle identification number (VIN), license plate number, and the like, as well as the location of the parked vehicle, a history of the user's parking transactions, a parking space identifier, and the like.

Alternatively, PTS 100 can allow users to conduct a parking transaction anonymously. A user can enroll only the user identifying data information needed for verification, such as biometric data, preexisting token data, a user identifier, or the like, rather than personal information, such as name, address, and the like. For example, the user record can be configured to include only the user's biometric data received upon the initiation of a parking transaction. Retrieval of the vehicle would then require a match to the previously provided data. Because a parking transaction cannot be completed without successfully locating the appropriate user record, such as via a biometric authorization, the transaction can be sufficiently secure without requiring the storage of other user information. This embodiment can be employed for a variety of reasons, such as to offer user anonymity, to increase the speed of the parking transaction, or the like.

The user record can be maintained for continuous use or for a limited amount of uses. For example, PTS 100 can function on a single parking transaction basis in which the user record is only maintained for one particular parking transaction. After a parking transaction has concluded, the user record can be deactivated or eliminated.

In one scenario, PTS 100 can be part of a broader system that processes authorizations for other fields in addition to parking transactions. For example, the system can conduct financial transactions, age-verification, vehicle rental procedures, or the like. Enrollment in PTS 100 can include configuring a user record in this broader system to handle parking transactions. Additionally, an enrollment promotion can be incorporated with user enrollment. For example, a user that registers via the Internet can receive one day of free parking at a system parking facility.

An operator record holds information useful for authenticating an operator, such as a name or identification number, device identification numbers associated with the operator, an address, and a phone number. An operator can be an individual or entity that has administrative capabilities in a PTS 100. These capabilities can range from being permitted to oversee a user authorization to having access to user records. For example, an operator can be a parking attendant, a parking facility owner, or a merchant associated with the parking facility. In an alternate embodiment of the present invention, the operator records also hold employer information if the operator is an employee of another operator. In another embodiment of the present invention, operator records hold an operator identifier, such as an SID, and/or operator biometric data. In one scenario, an operator can undergo biometric authorization before administering a user's authorization.

In addition to users and operators, agents of PTS 100 can have access to PTS functions and/or records. An agent can be an employee of PTS 100 capable of monitoring and assisting with the operation of PTS 100 functions. For example, an agent can access user records in order to verify user and operator registration data or administer PTS 100 maintenance procedures.

Database 104 is connected to network 102, which can be, but is not limited to, the Internet. Networks used in additional embodiments include local area networks (LANs), wide area networks (WANs), and telephone networks. Network 102 includes connections to at least one authorization station (AS) 106 where a user can be authorized, either biometrically or via a preexisting token. AS 106 includes the necessary means for sending and receiving information to and from a user and to and from a database. The user can employ AS 106 to enroll in PTS 100 and to perform system functions. AS 106 can be located in various locations, such as at a parking shuttle stop or on the parking shuttle itself. When retrieving their vehicles, users can employ AS 106 to retrieve vehicle location information to ascertain where they parked. For example, upon arriving at a parking facility, users can register the location of their vehicles at AS 106.

In one embodiment of PTS 100, AS 106 includes at least one biometric input device (BID). The BID is illustrated in FIG. 1 as a peripheral device for purposes of emphasis only. AS 106 could also include an integrated BID. In one scenario, AS 106 can simply be a BID connected to PTS 100. In another embodiment of PTS 100, AS 106 includes at least one token reader. The token reader can be a magnetic strip reader, bar code scanner, digital imager, RFID scanner, or any other device known in the art. The token reader is illustrated in FIG. 1 as a peripheral device for purposes of emphasis only. The token reader could also be integrated into AS 106. In one scenario, AS 106 can simply be a token reader connected to PTS 100. AS 106 can be equipped with both a BID and a token reader to allow for various forms of authorization. Possible incarnations of AS 106 include, but are not limited to, a gate, kiosk, vending machine, personal computer, service desk, point of sale terminal, telephone, RFID device, or wireless device connected via a wireless network. If AS 106 is a parking gate, successful user authorization can trigger the gate to open.

Additional embodiments of the system also include connections to one or more third party sources, such as third-party database 108, in which user information, including user biometric data or preexisting token data, is verified and/or from which user information is retrieved. The system can be connected to one or more financial sources in order to facilitate financial authorizations. For example, a user record stored at database 104 can indicate an account held at a financial services provider to debit for parking transaction payment.

Information transferred in the system can be encrypted. For example, information can be encrypted at one point and sent across a non-secure connection between points or not encrypted at a point of communication and sent to the other point of communication across a secure connection. Encryption and decryption of these messages can be monitored by services provided by a security company such as VeriSign. In one scenario, as an added level of security, information internal to a terminal and which is never transmitted can also be encrypted. This prevents retrieval of sensitive information (e.g., biometric data or preexisting token data) from a stolen terminal. In an additional embodiment, the system incorporates one or more anti-tampering methods by which to recognize authentic and non-authentic system requests.

In one embodiment, the system is configured as an "open" system, where all information entered into the system is transmitted to and stored in database 104. An open system allows authorization at any AS 106 in the system because an open system shares user information stored in database 104 with all stations.

In an alternate embodiment, the system is configured as a "closed" system, where information entered into the system via a specific operator device is transmitted to and stored in database 104 specific to that operator, and this information is not shared with another AS or database. This is referred to as a "closed" system because users need to enroll in the database in which they would like to perform authorizations. Database 104 in closed systems can query other databases, such as third-party database 108. However, all user information that is enrolled into a particular database is stored in that database. In an alternate embodiment of the closed system, information is stored in a partitioned database 104. Operator related information is stored in system, operator-specific partitions and is closed to all other operators. Only an authorized operator and authorized entities can access that partition of database 104. In yet an additional embodiment, information stored in one database or database partition can be stored in another database or database partition. Such an embodiment is useful for information protection in the event database information is lost.

In a further embodiment of the present invention, user information is "selectively shared" and stored in select multiple-operator databases or select multiple-operator partitions within database 104. In this embodiment, a group of operators share data with each other and they can choose to share system information with other operators within the system. Such a system is referred to as a "selectively shared" system. This system allows a chain of operators owned by the same entity or linked in some other manner to share user information without sharing that information with all other non-designated operators registered in the system. Information in such a system can be shared between one or more databases freely or sharing can be monitored by rules set in one of the databases or a combination thereof. By way of illustration and not as a limitation, one operator can choose to share user information with only one of five operators, or operators can choose not to send user information to database 104. Such a system allows operators greater control over information flow while still allowing various user conveniences, such as being able to undergo authorization at any AS 106 in a selectively shared chain.

The configuration of the system as an open, closed, or selectively shared system illustrates various ways of implementing the principles of the present invention. System configuration could be determined by the system in which user information is used. In one scenario, if PTS 100 is an open system, users can employ their identifying data for parking transactions at any parking facility networked to PTS 100. In another scenario, if PTS 100 is a selectively shared system, users can only employ the system at a particular chain of parking facilities that shares user data. As an example of PTS 100 in a closed system, an operator, i.e., a parking facility owner, could have a system configured with his own database 104 and AS 106 connected to that database. In this system configuration, the operator's database files only exist on database 104 and are retrieved or accessed for authorization only by pre-determined stations connected to database 104.

Figure 2:
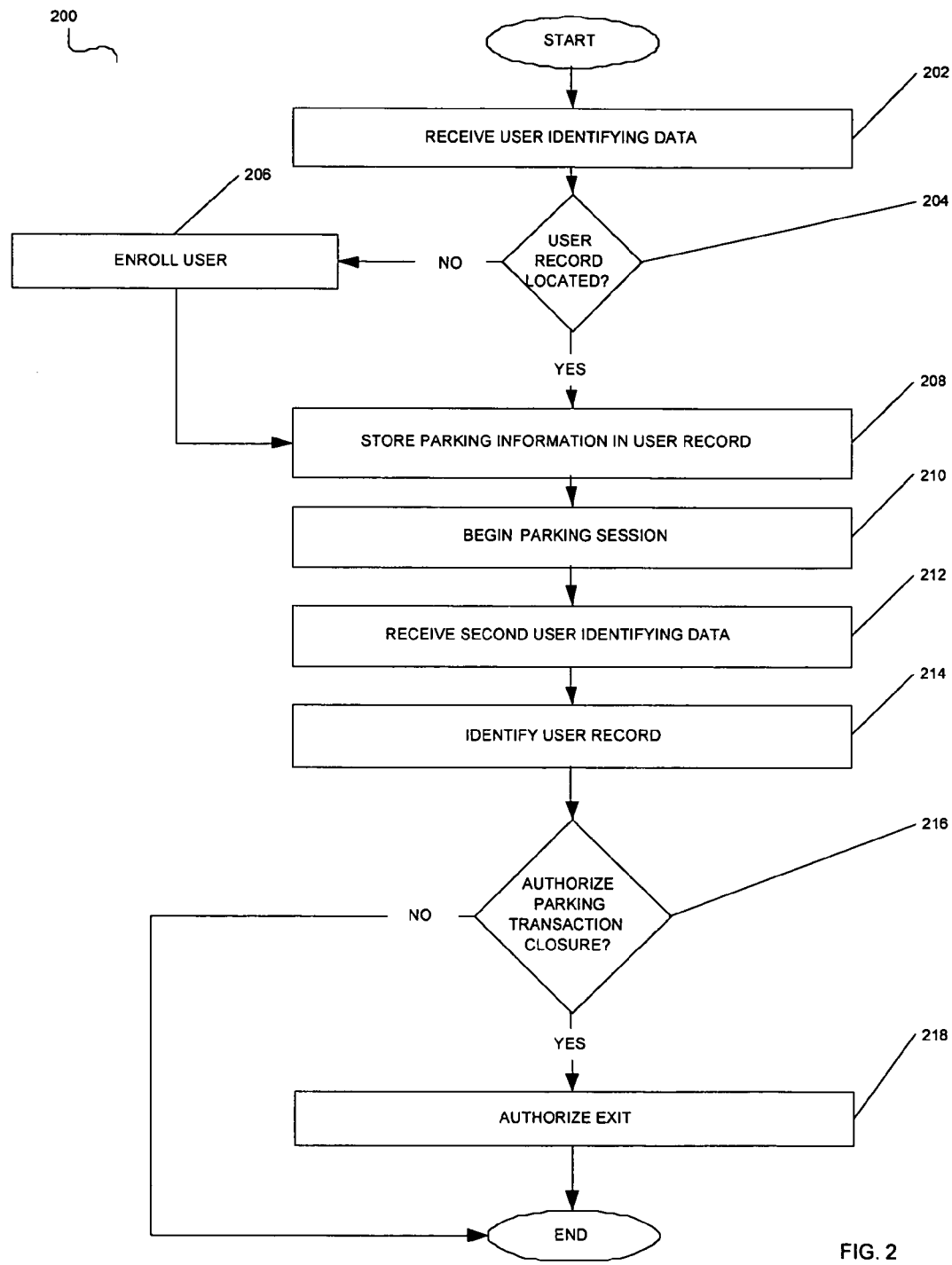
FIG. 2 illustrates a flowchart of a process for conducting a parking transaction using a parking transaction system.

FIG. 2 illustrates a flowchart of a process for conducting a parking transaction using PTS 100. At step 202, PTS 100 receives user identifying data, such as from a user or authorized individual, at AS 106. As aforementioned, user identifying data can include biometric data and/or preexisting token data. For example, a user can provide his fingerprint at an entry gate or a user, after parking his vehicle, can present his driver's license at a kiosk located near a user exit.

At step 204, the system attempts to locate the user record by comparing the received user identifying data with user identifying data stored in a user record. The user or authorized individual can provide a user identifier, such as an SID, to assist with user record recognition. If a user record is not located, the individual can opt to enroll in PTS 100 at step 206. Enrollment would entail at least receiving user identifying data and storing it in a user record. As aforementioned, user enrollment can allow for reoccurring use of PTS 100, or can be for a limited time, such as for a single parking transaction. In one embodiment, user information such as name, address, phone numbers, and other identifying and contact information can also be stored as part of a user record. Alternatively, enrollment can be anonymous. In another embodiment, financial account information is also stored in the user record to enable payment for the parking transaction upon successful identification of the user record.

At step 208, PTS 100 stores information pertaining to the parking transaction in the user record. Parking data can contain a variety of information, such as vehicle information (e.g., license plate number, and vehicle make and model), and as well as parking transaction information (e.g., parking space location and the date and time of parking transaction initiation).

Although a user can enroll in PTS 100 and register parking information while at the parking facility, in an alternate embodiment, the user or authorized individual can perform one or both of these steps prior to arriving at the parking facility. For example, a user can enroll in PTS 100 and register parking information in advance to avoid doing so at the parking facility. In one scenario, the user can perform a general enrollment in this fashion, thereby alleviating the need to provide this information at any parking facility connected to PTS 100.

After the parking transaction information is stored at step 208, the parking session commences at step 210. The duration of the parking session can vary. For example, the parking session can last a few hours if the user is attending a sporting event, shopping at a mall, having dinner at a restaurant, or the like. Conversely, the parking session can last for a considerable amount of time, such as a few days, a week, or longer. For example, a user can leave his vehicle in long-term parking at an airport while on vacation or a business trip.

Upon conclusion of the parking session, at step 212, PTS 100 receives user identifying data a second time via AS 106. Depending upon the embodiment, the user identifying data can be received from the same person that initiated the parking transaction or from another person, such as an authorized individual designated in the user record. The user or authorized individual can present a user identifier, such as an SID, to assist with the location of the user record. For example, to authorize the conclusion of the parking transaction biometrically, the user can provide biometric data and an SID to AS 106. Alternatively, to conclude the parking transaction via a preexisting token, the user can present a preexisting token to AS 106. As mentioned above, AS 106 can assume a variety of embodiments. In one embodiment, AS 106 can be the user's own mobile device, such as a cell phone.

At step 214, PTS 100 identifies the user record associated with the user identifying data received at step 212. For example, if AS 106 receives biometric data at step 212, PTS 100 can compare the received biometric data with biometric data stored in the user record. Alternatively, if AS 106 receives preexisting token data at step 212, PTS 100 can compare the received preexisting token data with preexisting token data stored in the user record. The stored user identifying data can be data received at step 202 or can be user identifying data received prior to the current parking transaction, such as during a previous enrollment.

At step 216, PTS 100 determines whether to authorize closure of the parking transaction. If the closure of the parking transaction is authorized, the user or authorized individual is authorized to exit at step 218. A user can be authorized to conclude the parking transaction if the user identifying data received at step 212 matches the stored user identifying data. For example, if biometric data received at step 212 matches the biometric data stored in the user record, the user is authorized to exit the facility with the vehicle at step 218. Alternatively, a user can be granted authorization if the user identifying data received indicates the proper user record. For example, a user that has registered both his driver's license and VISA card in his user record can present his driver's license to initiate a parking transaction and his VISA card to conclude it. Because both the driver's license and VISA are registered in the same user record, PTS 100 can view the result of the comparison as positive. In another example, a user can register both his fingerprint and his MasterCard in his user record. The user can present his fingerprint at parking transaction initiation and his MasterCard at its conclusion.

If the person presenting user identifying data at step 212 is an authorized individual, this person can conclude the parking transaction if the user record indicates the he is permitted to do so. For example, the authorized individual may be the user's wife and her biometric data can be stored in his user record. At step 212, the wife presents her biometric data. At step 214, PTS 100 uses the wife's biometric data to locate the appropriate user record, i.e., her husband's user record. Because the wife is designated as an authorized individual in the user record, at step 216 the system determines she is authorized to conclude the parking transaction and at step 218, she is authorized to exit the parking facility with the vehicle.

If the AS 106 used to receive user identifying data at step 212 is not the parking facility's exit gate, the user or authorized individual can additionally undergo identification procedures at a parking gate at step 218 before being permitted to leave the parking facility with his vehicle. For example, the user can provide user identifying data at a kiosk at step 212 to conclude the parking session and present user identifying data at step 218 to open the parking gate.

If the parking facility requires the user or authorized individual pay before exiting with the vehicle, AS 106 can be a payment kiosk. The AS 106 used at step 212 could be the same station that was utilized when parking the vehicle or can be a different station. For example, the user can initiate the parking transaction at a kiosk located near a parking facility's user exit at step 202 and, when concluding the parking transaction, the user can provide user identifying data for payment at a kiosk located on the level where his vehicle is parked at step 212. Alternatively, AS 106 can be an exit gate and the user or authorized individual can pay from the vehicle while receiving authorization to exit the facility, for example, by authorizing the debiting of a financial account identified in the user record. This configuration allows for a convenient method of authorizing the exit and payment simultaneously, thereby making the process of exiting the parking facility more efficient.

In one embodiment, PTS 100 can assist the parking facility in fee processing. A parking transaction fee can be a flat charge unaffected by the duration of the stay. In another scenario, the parking transaction fee can vary per the length of the stay (e.g., the parking facility can charge an hourly rate). In one embodiment, a user can employ a PTS 100 parking facility throughout a set period for a flat fee. By receiving user identifying data whenever a user enters the facility, the system can determine whether the user has an ongoing parking transaction with the facility or if the user is a new customer. For example, a parking facility can allow users of PTS 100 to park their vehicles in the facility multiple times throughout a day for a single fee.

Payment for the parking transaction can be processed biometrically. For example, upon a user's successful biometric authorization, a financial account registered in the user record can be debited for the account. If the user identifying data employed for parking transaction conclusion is a financial token, it can serve as the method of payment. Alternatively, if the preexisting token is non-financial, the token can be associated with a financial account via the user record. In one embodiment, even if a financial token is used for the parking transaction, the user record can be configured to apply a different financial account for payment. For example, a user can utilize his MasterCard to initiate and conclude parking transactions, but configure his user record to charge his checking account for the associated parking fees. A user can establish a preferred financial account to be used for parking transactions. For example, a user can designate that his checking account be billed for all parking transactions regardless of the user identifying data provided.

Alternatively, PTS 100 can be utilized for user tracking purposes, but not for payment processes. An operator can use a payment process independent from PTS 100 or the parking transaction need not necessitate payment. For example, an employer can use PTS 100 to ensure that only employees park vehicles in the company parking facility and monitor the times of entry and exit.

As mentioned above, if PTS 100 employs preexisting tokens, a wireless transmitter such as an RFID device can serve as the preexisting token. For example, the preexisting token can be a SmartTag, in which the token's primary function is interstate tolls payment. To employ the RFID device, the user can register the device's identification number in his user record via AS 106. For example, the user can access his user record via a system website and register the necessary information to use the RFID device at parking facilities. In one scenario, the user is provided with a PTS number to allow the RFID device to function in PTS 100. For example, the user can receive a receipt from AS 106 upon initiating a parking transaction and the receipt can contain a PTS number the user can associate with his RFID device in his user record. The user can then register the PTS number at AS 106 to employ PTS 100 upon exit or at a subsequent visit. Alternatively, depending upon system configuration, PTS 100 can register RFID device automatically via the device's identification number, a PTS number, or the like.

If the RFID device has a financial function it can be employed for parking transaction payments. Alternatively, the user can associate the RFID device with a financial account independent of its primary function for parking transaction payments. Once the user has registered the RFID device and specified a financial account in his user record, the RFID device can be used to authorize access or exit to a parking facility, as well as perform parking transaction payments. For example, the RFID device can transmit authorization information to PTS 100 when the user parks his vehicle in the parking facility. When the user exits, the RFID device can transmit exit authorization information and payment information to PTS 100, thereby granting the user permission to exit and automatically processing a parking transaction payment. In alternate embodiments, other wireless transmitters can serve as preexisting tokens in PTS 100, such as those that transmit information via infrared, Bluetooth, or other wireless means.

Additionally, PTS 100 can employ a wireless transmitter to provide additional functionality and convenience for biometric processes A wireless transmitter device can transmit information to AS 106 to assist in authorization or can serve as AS 106 itself. The wireless transmitter can incorporate a BID, allowing the user to perform biometric authorizations while in the vehicle. Biometric data and transmitter information can be transmitted to AS 106, where it can be compared or transmitted to database 104. Alternatively, the biometric data submitted to the wireless transmitter can be matched with biometric data stored thereon, thereby allowing the device to transmit only authorization confirmation, instead of biometric data. In this scenario, the biometric data is stored locally, which some users may prefer because no one else can access the wireless transmitter unless authorized. Regardless of the comparison method, a successful authorization can allow a user to enter or exit with the vehicle.

One embodiment of PTS 100 allows a user to reserve a parking space before arriving at the parking facility. For example, if AS 106 is the user's personal computer connected to PTS 100 via the Internet, the user can reserve a parking space via a system website. In another illustration, AS 106 can be a kiosk located at an off-site location, such as an airport, a restaurant, or the like, that allows users to reserve parking spaces at a parking facility. In another scenario, AS 106 can be a telephone from which the user can access PTS 100. In a biometric scenario, if AS 106 does not have a BID, a user can reserve a parking space with a user identifier, such as an SID. If AS 106 is a telephone, the user can provide voice biometric data and/or a user identifier by speaking into the telephone. In a preexisting token scenario, if AS 106 does not have a token reader, a user can reserve a parking space with a user identifier, or can provide preexisting token data in another fashion, such as via a keyboard. When the user arrives at the parking facility, he can approach AS 106 and provide his user identifying data (i.e., biometric data and/or preexisting token data) to notify PTS 100 that he has entered the parking facility. In one embodiment, the user cannot access the parking facility until he has provided user identifying data. In one scenario, if the user employs PTS 100 to reserve a particular parking space, AS 106 can be unique to a parking space. When the user provides his data to AS 106, AS 106 can transmit a device identifier to notify the system that the associated parking space has been taken.

Depending upon the embodiment, a user can reserve a particular parking space within the parking facility or the parking space reservation can simply guarantee the user a parking space somewhere within the parking facility. PTS 100 can employ the receipt of user identifying data to manage parking space availability. Once PTS 100 has received a reservation, it can denote that a parking space is no longer available. When the system receives user identifying data at the conclusion of the parking transaction, PTS 100 can then mark a parking space as available.

Regardless of whether PTS 100 employs user biometric data, preexisting token data, or a combination thereof, the system can be configured to handle parking transaction payments in a variety of manners in addition to those described. Payment can be processed before a parking transaction. For example, if the user has reserved a parking space, he can provide payment for part of the total parking fee. If the user makes reservations at a parking facility that bills hourly, the prepayment can be based on the user's estimated length of stay. If the stay is shorter than the prepaid amount, the user can receive a refund or receive a parking credit to use at a subsequent parking transaction. Conversely, a user can pay for a parking transaction after exiting with his vehicle. For example, a user record can contain a user's mailing address or email address and a parking bill can be sent to the user, providing instructions regarding how to pay for the parking transaction. PTS 100 can maintain a parking tab for the user and bill the user for multiple parking transactions at one time. For example, the user can be billed monthly. Alternatively, the parking facility operator, such as a hotel, can offer other services and the user can be billed for parking in conjunction with these services. In another scenario, the parking facility operator can collaborate with a third-party, such as third-party hotel, to provide the user with a combined bill. In this scenario, PTS 100 can share user information with the third-party, such as through network 102 to third-party database 108.

The financial account employed for parking transaction payment can be predetermined in the user record or the user can select the account via AS 106. For example, AS 106 can display the financial accounts the user has registered in his user record and allow the user to select one. In addition, a user identifier can assist with payment processes. If the user is allowed to pay for a parking transaction at a variety of times (i.e., before, during, or after a parking transaction), the particular user identifier provided at parking transaction initiation or conclusion can indicate the user's preferred time of billing. Additionally, the user can have multiple identifiers associated with various financial accounts registered in his user record. By providing a particular user identifier during parking transaction initiation or conclusion, a user can indicate which financial account to use for the parking transaction.

In one embodiment, the user record can indicate a stored-value account to be used for parking transactions. If PTS 100 is an open system, the stored-valued account can be accepted at all parking facilities in the system. Alternatively, if the PTS 100 is a selectively shared system, the stored-value account may only function at a particular chain of parking facilities connected to PTS 100. If PTS 100 is used at a closed system, such as an independent parking garage, the user can use the stored-value account only at that particular parking garage. The value stored in the account can be a monetary value or can relate to particular parking transaction data, such as a specific amount of entrances and exits, an amount of time (e.g., hours), a certain time range (e.g., between 8:00 AM and 5:00 PM), or the like. For example, the user can purchase twelve hours worth of parking time or prepay for parking for Mondays for a year.

PTS 100 can also include a method to provide gratuity to an operator, such as a parking valet. For example, AS 106 can include an input device, such as a touch screen or keypad, that allows the user to specify a tip. The tip amount can be charged to a financial account specified for parking transactions in the user record. In one scenario, the financial account used for gratuity is separate from the account used for the transaction payment. The operator can have an account associated with PTS 100 to facilitate gratuity payments. For example, an operator record in database 104 can specify a financial account to credit for gratuity. This financial account can be a single financial account maintained by the operator, which can be necessary if a parking facility divides gratuity evenly among employees. Alternatively, the financial account can be unique to the operator, e.g., the parking valet. For example, the account can be a personal checking account or a payroll account in which the tip is added to an operator's paycheck.

As mentioned, in addition to user identifying data, a user record can store information regarding the location of the user's vehicle. When the user presents his biometric data or preexisting token to AS 106, he can also indicate the vehicle location within the facility, such as by providing a parking space or level number. When retrieving his vehicle, the user can access AS 106 to retrieve this parking information. Alternatively, if AS 106 is manned by an operator, the operator can be provided with the parking information and provide it to the user. In one scenario, the operator could use the parking information to escort the user to the vehicle.

In one embodiment, the user can employ a wireless device, such as a mobile phone or personal digital assistant, to gain assistance in locating his vehicle. The user can register his wireless device with PTS 100, allowing AS 106 to send a message (e.g., a text message or a voice message) containing parking information to the user's wireless device. In one scenario, the user's wireless device is AS 106, and the user can utilize it to store the vehicle's location in the user record. The wireless device can employ triangulation, global positioning, or other methods known in the art to record the vehicle's location. Additionally, the parking facility can send a message providing other information, such as a parking facility's closing times or periodic reports regarding the condition of the vehicle. Alternatively, the user can notify the operator, such as a valet, via AS 106 (e.g., a wireless device or a kiosk) to retrieve his vehicle. Likewise, the operator can inform the user via PTS 100 that the vehicle is ready.

As aforementioned, PTS 100 can store vehicle information in the user record, such as the vehicle's make and model, a license plate identifier, mileage, insurance information, an RFID identifier, or the like. If the vehicle is stolen or damaged while at the parking facility, this information could be provided to the appropriate authorities. For example, the police can use vehicle information to locate a stolen vehicle, or an insurance agency can utilize such information if the vehicle is damaged while at the facility. Vehicle information can be manually accessed by a user, operator, agent, or an authorized third-party (e.g., the police or insurance agency). Alternatively, this information can be automatically transmitted from the database 104 to third-party database 108 (e.g., the appropriate authority's database).

In an additional embodiment, PTS 100 can employ user information in the user record to regulate user access to system functions. In addition to receiving such information from users themselves, user information can be obtained from any database connected to network 102, such as third-party data 108. For example, PTS 100 can receive user information from other operators or third-parties connected to PTS 100. User information can include data such as a user's parking transaction history, driving history, financial history, criminal history, or the like. In one scenario, users have to be in good standing with PTS 100 in order to park or retrieve their vehicles. Data acquired from third-party sources can be used for a variety purposes. For example, the parking facility can receive data from a drinking establishment indicating the user is intoxicated and should not drive. In another scenario, the parking facility can receive data from the police indicating that a user's driver's license has been revoked and that the user should not be allowed to obtain his vehicle.

In addition to conducting parking transactions, PTS 100 can grant a user pedestrian access to the parking facility via biometric authorization. This feature can be particularly useful if the parking facility is unmanned for all or part of the day. For example, an operator may wish to allow users to access the parking facility after normal business hours. A user attempting to access a pedestrian entrance can provide biometric data before entering. If the received biometric data does not match data found in a user record, the user can be denied entrance. In addition, other information pertaining to the user, the vehicle, or the like in the user record can be obtained during a biometric access authorization, and PTS 100 can associate such information with the biometric access.

In one embodiment, system parameters can determine a user's successful biometric access authorization. For example, users employing PTS 100 anonymously may not be granted access while fully enrolled users are. In one scenario, anonymous users can undergo full enrollment to gain access when attempting to enter the parking facility biometrically. In general, PTS 100 can allow users to perform anonymous parking transactions during business hours, but require full enrollment for after-hours functionality. This embodiment allows PTS 100 to monitor users employing after-hours services carefully, ensuring that the system has the user's contact information in case an issue should arise.

In another embodiment, PTS 100 only grants access to users that have an active parking transaction at the parking facility, thereby prohibiting unscrupulous users from entering a parking facility where they do not have a vehicle parked. Furthermore, PTS 100 can employ third-party information to regulate user pedestrian access. For example, if a drinking establishment notifies the system that the user is intoxicated, the user cannot access the parking facility. The system can monitor the number of pedestrians entering the facility after a biometric authorization has opened an entrance for tracking and security purposes. Such monitoring can transpire in a variety of methods known in the art, such as video surveillance.

In one embodiment, PTS 100 can provide a convenient parking validation service via user identifying data. For example, PTS 100 can be part of a biometric authorization system that provides several other services, such as financial transaction payments for a variety of entities, in addition to parking operations. Users can perform a particular action associated with an affiliated third-party in order to validate parking transactions. In one scenario, a user can make a purchase with a third-party networked to the system in order to have his parking validated. For example, a shopping mall's parking facility can employ PTS 100, which can be connected to a biometric authorization system used by mall merchants for purchase transactions. When a user presents his biometric data to retrieve his vehicle from the parking facility, PTS 100 can examine his user record to determine if the user made a biometric purchase at a participating merchant. If so, the user's parking fee can be discounted or waived. In another scenario, the user need not make a purchase, but simply undergo biometric authorization. For example, a third-party, such as a doctor's office, can have a validation station at which users can undergo biometric authorization in order to have their parking fees waived. The user record would contain an indicator of whether the user underwent the appropriate biometric authorization. Although such an arrangement cannot guarantee a sale, it can ensure that the user visits the third-party, in turn increasing the chance of a sale.

Likewise, the user can provide another form of user identifying data, such as a preexisting token, to the third-party and receive parking validation. For example, a user can register his VISA in his user record. While shopping at a mall, the user can use this VISA to make a purchase from a third-party. The user can present his biometric data to retrieve his vehicle from the parking facility, and PTS 100 can note that the VISA enrolled in the user record has been utilized to make a purchase at a participating third-party and validate the user's parking transaction. In another illustration, a user can utilize his credit card for a purchase at Waldenbooks. When the user provides his preexisting token (e.g., the same credit card or another token) to PTS 100 to authorize the conclusion of his parking transaction, the system can recognize that a credit card registered in the user record was employed to make a purchase at a validating third-party and waive the user's parking fee.

The discount offered for parking validation can be determined by one or more parameters. For example, validation can be available only during special events, or the amount can vary by the length of the parking stay, the amount purchased, the validating third-party, or the like.

In addition to parking validation, PTS 100 can provide convenient methods for further synergy between third-parties, such as retailers, restaurants, hotels, parking facility operations, and the like. In one scenario, PTS 100 can provide the user with a parking credit based upon purchases made at such affiliated operators. For example, users can save one dollar on their parking fee for every ten dollars they spend at an associated mall. In another scenario, the parking credit can be based upon a particular item. For example, if a user buys a steak dinner at an associated restaurant, the parking fee can be waived. Additionally, the affiliated operator can provide credit for its own services if the user employs PTS 100. For example, if the user parks at a PTS 100 facility, an operator can offer a discounted price to an attraction. Multiple operators can be associated via PTS 100 and cooperate to provide a promotion. For example, in order to encourage the use of public transit, an operator can agree to work with a transit authority and offer users a discount that park at a subway station parking lot equipped with PTS 100. The particulars of the arrangement between operators would be dependent upon implementation.

Alternatively, a PTS service provider can offer various promotions. For example, a parking facility can employ both traditional parking methods as well as PTS 100. To encourage users to employ PTS 100, a user can receive a lower price for parking transactions if they use PTS 100 instead of the traditional parking method. The particulars of the arrangement between the PTS service provider and the operator can vary. For example, the operator can agree to accept lower prices for PTS 100 parking transactions. Alternatively, the PTS service provider can agree to pay the operator the difference in the promotional parking fee and the standard parking fee. For example, if the standard parking fee is $5.00 an hour, the PTS service provider can offer a promotional fee of $4.00 an hour and pay the operator the $1.00 difference. Another promotion can reward users for frequently using PTS 100. For example, for every six parking transactions a user conducts with PTS 100, he can receive one parking transaction free.

Additionally, PTS 100 allows for a convenient valet method. A user can leave his vehicle and the key with an operator upon entering a parking facility. The operator can then park the vehicle, record the parking location of the vehicle, and transmit this information to the user or store the information in database 104. When recording the vehicle's location, the operator can also record a user identifier obtained from the user, a vehicle identifier (e.g., license plate number), or another identifier associated with the user record. Alternatively, the operator can record an identification number unassociated with the user record, such as a number printed on a parking token generated upon parking transaction initiation. When the user wishes to retrieve his vehicle, the user can review the parking location via AS 106, locate the vehicle within the parking facility, and leave the parking facility after providing registered user identifying data. Alternatively, the operator can retrieve the vehicle for the user or can assist the user in locating the parking location. Depending upon the scenario, the operator can lock the vehicle key within the vehicle, thereby requiring the user to have a second key to gain access.

Alternatively, the vehicle key can be placed in a biometrically secured location, such as a biometric locker. The valet can associate the user with a particular locker by entering an identifier, such as a user identifier, a vehicle identifier, or the like. In such a scenario, to retrieve the vehicle key, the user can provide his biometric data to the secured location to retrieve his keys. This embodiment can be particularly useful if a parking facility wishes to offer service after normal business hours. The user can access the parking facility, in one scenario via biometric access, retrieve his key from the biometric locker, and then obtain his vehicle. In one embodiment, a user not enrolled in PTS 100 at the initiation of the parking transaction can be asked to enroll when attempting to retrieve his keys after normal business hours.

In an additional embodiment, the user can designate valet functionality in his user record. For example, a user can authorize an individual identified as a valet to park or retrieve his vehicle. This authorization can be an established parameter noted in the user record or the user can establish this functionality when parking the vehicle. In the latter case, the user can limit the functionality to a particular valet, rather than a general consent granting authorization to all valets registered in PTS 100.

In an additional embodiment, PTS 100 can work in conjunction with a traditional parking token system. This can provide the user with the option of using either biometric data, a preexisting token, or a traditional parking token. This embodiment allows PTS 100 to be a viable option for users that may be reluctant to provide their biometric data (e.g., fingerprints) or preexisting token data (e.g., credit card numbers) and feel more comfortable with a traditional token. Furthermore, a user can give the token to someone else. In one scenario, user biometric data or a preexisting token can serve as an alternate system to be employed if the parking token is destroyed or lost.

In an alternate embodiment, biometric data received from the user can be stored on a parking token issued to the user in addition to, or in place of, being stored in a user record. Users may be more comfortable with a system that does not store biometric data in a database. A biometric parking token allows biometric data to be stored in a local user record (i.e., the parking token), which some users may prefer because no one without the parking token can access their biometric data. The biometric data can be recorded on the token via a bar code, magnetic stripe, or the like. In one scenario, the parking token is a Smartcard that houses the received biometric data. When the user wishes to retrieve his vehicle, he can present the biometric parking token and his biometric data to AS 106. AS 106 can acquire the biometric data from the token and compare it to the received biometric data. If the received biometric data and the parking token biometric data match, the user is authorized. If user biometric data is also registered in a user record at database 104, PTS 100 can compare all the biometric data (i.e., the received biometric data, registered biometric data, and the parking token biometric data), thereby providing greater security. In one embodiment, the registered biometric data can be used as an alternate method of authorization if the user does not have his biometric parking token. Alternatively, PTS 100 can compare the received biometric data and parking token biometric data, or the received biometric data and registered biometric data. Which biometric data the system compares can be randomly determined or predetermined by an operator or agent. In such a scenario, the system would typically request biometric data and the parking token biometric data, regardless of which biometric data is actually employed for the comparison, thereby concealing the actual comparison process from user to prevent exploitation of such a method. For example, the user can present the biometric parking token and his live biometric data to AS 106. PTS 100 can then compare the live biometric data with biometric data stored in a user record at database 104. However, PTS 100 would not inform the user which data was being compared.

PTS 100 can be employed in a variety of parking environments in order to increase efficiency and provide the user with greater convenience. For example, AS 106 can be similar to a parking meter and can provide service for numerous parking spaces. In another scenario, several AS 106 units can be positioned in a row, similar to the typical layout of gas pumps at gas stations. This configuration can increase the speed of exiting and reduce traffic at the gate by allowing multiple users to authorize their exit simultaneously.

Although the present invention has been described in reference to a parking facility, the system and methods illustrated above could be applied in other environments. In particular, the present invention could be particularly useful in environments that typically involve customers waiting in line to pay admission charges. For example, at an amusement park or night club, the entry process for users could be improved by allowing them to provide their biometric data or preexisting token to indicate a user record containing a method for payment. This would alleviate the time-consuming process of teller-administered admissions. Additionally, user identifying data can provide a convenient method to monitor user exit and reentry.

A system and method of performing parking transactions has been illustrated. It will be appreciated by those skilled in the art that the system and method of the present invention can be used to perform parking transactions via biometric data or preexisting tokens in a parking transaction system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. In addition, it is to be understood that the phraseology and terminology employed herein are for the purposes of description and should not be regarded as limiting.

What is claimed is:

1. A parking transaction method, comprising:
receiving a vehicle at a parking facility;
storing an indication of receipt of said vehicle in a record upon storage of said vehicle in said parking facility, wherein said record stores information that is associated with a plurality of individuals authorized to park or retrieve said vehicle, wherein said information includes registered biometric data for at least one individual;
receiving tokenless biometric data from a user at said parking facility;
comparing said received tokenless biometric data with said registered biometric data;
authorizing release of said vehicle from said parking facility if said received tokenless biometric data matches said registered biometric data; and
charging a parking fee to a financial account that is associated with said record, wherein said parking fee is determined on the receipt of said received tokenless biometric data.

2. The method of claim 1, wherein said receiving a vehicle is accomplished by a parking attendant.

3. The method of claim 1, wherein said tokenless biometric data is received at a kiosk.

4. The method of claim 3, wherein said kiosk identifies a location of said vehicle in said parking facility.

5. The method of claim 1, wherein said tokenless biometric data is received at an exit to said parking facility.

6. The method of claim 1, wherein said tokenless biometric data is received at a secured location, said secured location housing a key to said vehicle.

7. A parking transaction method, comprising:
registering receipt of a vehicle at a parking facility;
receiving a request from a user for retrieval of said vehicle from said parking facility, wherein said request includes a provision of information associated with said user, said information being one or more of user biometric data and preexisting token data;
determining whether said provided information associated with said user matches information stored in a record that is associated with said registered receipt of said vehicle, wherein said record stores information that is associated with a plurality of individuals authorized to park or retrieve said vehicle; and
authorizing release of said vehicle from said parking facility if said provided information associated with said user matches information stored in said record.

8. The method of claim 7, wherein said preexisting token is a financial token.

9. The method of claim 7, wherein said record is a parking token issued to said user.

10. The method of claim 7, wherein the individual that retrieves said vehicle is different from the individual that brings said vehicle to said parking facility.

11. The method of claim 7, wherein registering receipt of a vehicle comprises storing information associated with said user.

12. The method of claim 7, further comprising processing payment for a fee associated with the parking transaction from a financial account associated with said record.

13. The method of claim 12, wherein said financial account is associated with said provided information.

14. The method of claim 12, wherein said financial account is a stored-value account associated with said parking facility.

15. The method of claim 7, further comprising issuing a parking token to said user.

16. A method for conducting a parking transaction, said method comprising:
   at a parking facility, receiving first biometric data from a user;
   determining whether said user is associated with one of a plurality of existing records, said determining including comparing said first biometric data with registered biometric data, wherein each said existing record is capable of storing registered biometric data for a plurality of users;
   if said user is not associated with an existing record, storing said first biometric data in a new user record;
   at said parking facility, receiving second biometric data from said user;
   comparing said second biometric data to stored biometric data, wherein said stored biometric data is associated with one or more of said plurality of existing records and said new record; and
   authorizing the conclusion of a parking transaction if said comparison indicates a match.

17. The method of claim 16, further comprising charging a fee for said parking transaction to a financial account associated with a record associated with said user.

18. The method of claim 16, further comprising storing parking information.

19. The method of claim 18, wherein said parking information is received from one of said user and an operator.

20. The method of claim 18, wherein said parking information includes one or more of time information, date information, a vehicle location, a vehicle identifier, a parking space location, and a parking space identifier.

21. The method of claim 18, wherein said user accesses said parking information via an authorization station.

22. The method of claim 18, further comprising communicating said parking information to a third-party.

23. The method of claim 18, further comprising communicating said parking information to said user, wherein said user has requested assistance in locating a parked vehicle.

24. A method for validating a parking transaction, said method comprising:
   receiving a vehicle from a user at a parking facility;
   receiving, at a third-party location, first user data, wherein said first user data is one of user biometric data and preexisting token data;
   utilizing said user data to process a third-party transaction, wherein said processing includes locating a user record associated with said first user data;
   receiving, at a parking facility, second user data;
   utilizing said second user data to locate said user record; and
   if said user record indicates said third-party transaction, authorizing the user to conclude a parking transaction with said parking facility, wherein a fee for said parking transaction is reduced.

25. A parking transaction method, comprising:
   registering receipt of a vehicle at a parking facility;
   receiving a request from a user for retrieval of said vehicle from said parking facility, wherein said request comprises providing biometric data received from said user without the use of a token;
   determining whether said provided biometric data matches biometric data stored in a record that is associated with said registered receipt of said vehicle, wherein said record stores biometric data for a plurality of individuals authorized to park or retrieve said vehicle; and
   authorizing release of said vehicle from said parking facility if said provided biometric data matches said stored biometric data.

26. The method of claim 25, wherein the user is different from the individual that brings said vehicle to said parking facility.

27. The method of claim 25, wherein registering receipt of a vehicle comprises storing information associated with said user.

28. The method of claim 25, further comprising processing payment for a fee associated with the parking transaction from a financial account associated with said record.

* * * * *